June 29, 1965     H. ALLEN     3,191,619
CHECK VALVE HAVING MOVABLY MOUNTED HEAD AND SEAT
Filed Sept. 18, 1962     2 Sheets-Sheet 1

Herbert Allen
INVENTOR.

BY Browning, Simms, Hyer
& Eickenroht
ATTORNEYS

June 29, 1965 H. ALLEN 3,191,619
CHECK VALVE HAVING MOVABLY MOUNTED HEAD AND SEAT
Filed Sept. 18, 1962 2 Sheets-Sheet 2
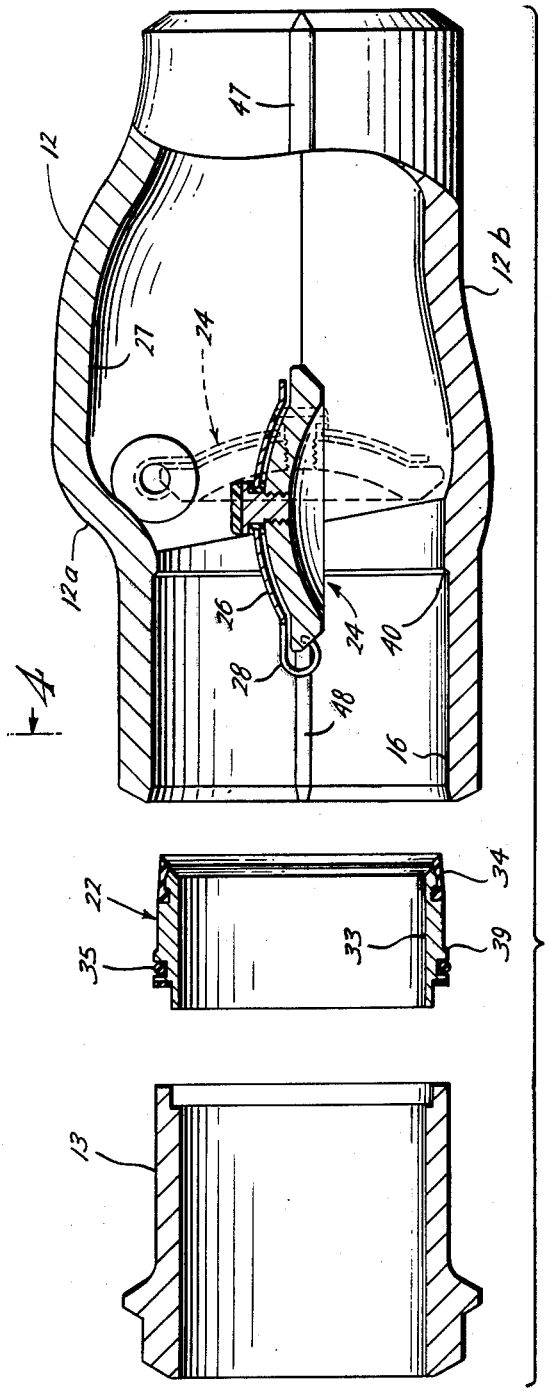
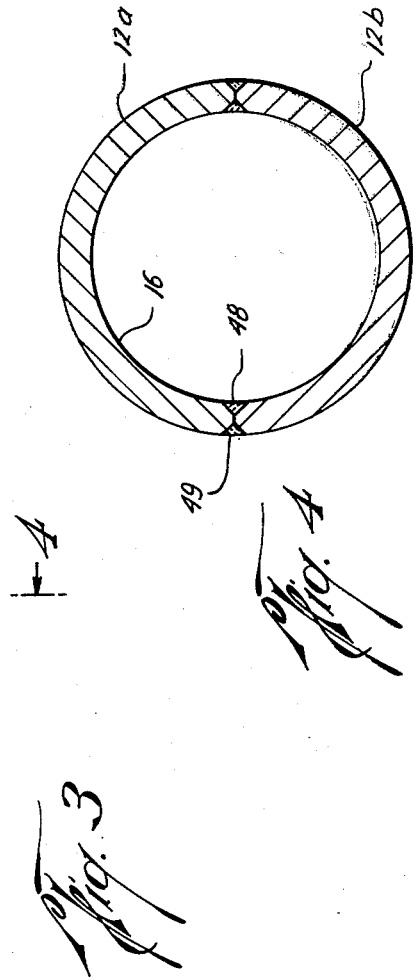
Fig. 3
Fig. 4
Herbert Allen
INVENTOR.
BY Browning, Simmons, Meyer & Eickenroht
ATTORNEYS ated June 29, 1965

3,191,619
CHECK VALVE HAVING MOVABLY MOUNTED
HEAD AND SEAT
Herbert Allen, Houston, Tex., assignor to Cameron
Iron Works, Inc., Houston, Tex.
Filed Sept. 18, 1962, Ser. No. 224,445
2 Claims. (Cl. 137—527.4)

This invention relates to an improved clapper type check valve.

It is the conventional practice, in this type of valve, to assemble, replace and repair the clapper through a removable bonnet on the top of the valve body. Obviously, this complicates the construction of the valve in that it requires a sealed connection between the bonnet and remainder of the body which must be strong enough to contain the pressure in the valve. It is therefore the primary object of this invention to provide a clapper type check valve which does not require such a bonnet; and, more particularly, to provide such a valve in which the clapper is assembled in the body in a more or less permanent fashion through a portion thereof which need not have a high pressure releasable connection with the remainder of the valve body. Another object is to provide such a valve in which the clapper is cushioned toward the end of its closing movement so as to lessen its slam and then yieldably engaged by a seat to maintain a light seal thereagainst.

These and other objects are accomplished, in accordance with the illustrated embodiment of the present invention, by a check valve having a body which includes a first tubular portion and a second tubular portion fitting within the opening through one end of the first tubular portion and connected to said first portion to provide a flowway. There is an annular seat on the inner end of the second tubular portion, and a clapper type valve member is pivotally mounted on the first tubular portion for swinging between a position adjacent the inner wall of the first tubular portion to open the flowway and a position against the seat and across the flowway to close same.

More particularly, the valve member has a minimum lateral dimension which is less than the maximum lateral dimension through the opening through the one end of the first tubular portion of the body. Thus, in the assembly of the valve, the valve member may be passed through such opening and into a position intermediate the ends of said first tubular portion where it may be pivotally mounted by means of one or more hinge pins inserted from outside the first tubular portion through openings therein. At this time, the second tubular portion may be moved into place within such end of the first tubular portion and fixedly connected thereto with the seat on its inner end in operative position for seating the pivotally mounted clapper in its closed position.

The first tubular portion of the body has an offset intermediate its ends to receive the valve member in its open position, and the valve member has bearings which, upon passage of the valve member through the one end of the first tubular portion, may be oriented into position to dispose their openings opposite the inner ends of the hinge pins. The opening through the one end of the first tubular portion is larger than the opening through the other end thereof, and the opening through the second tubular portion of the body and the seat on its inner end is approximately equal to the opening through said other end of the first tubular portion so that, when the clapper is swung up into the body offset, there is a substantially full opening through the valve body.

In the drawings, wherein like reference characters are used throughout to designate like parts:

Figure 1:
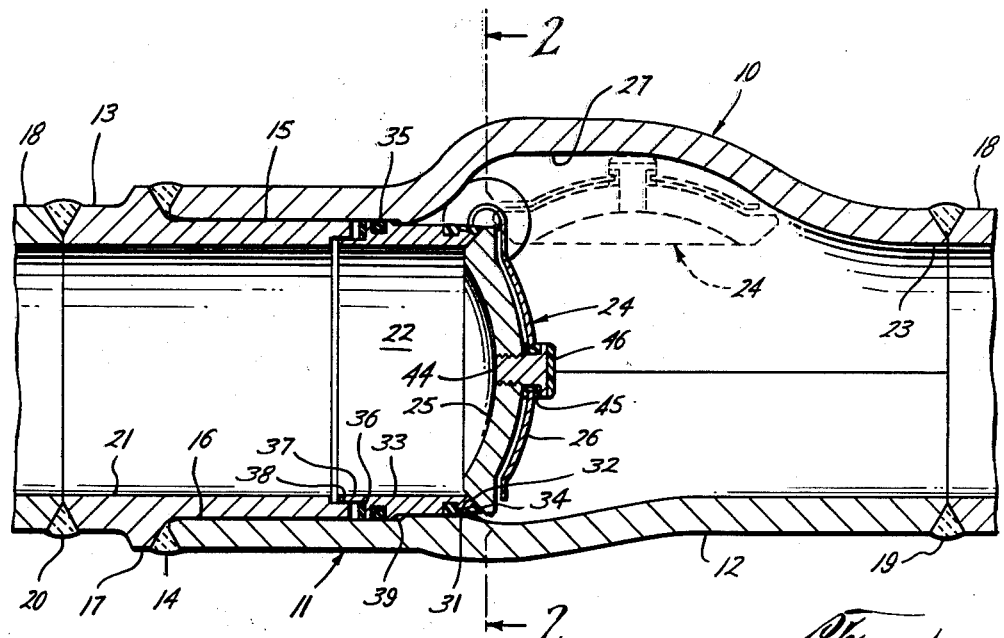
FIG. 1 is a longitudinal sectional view of a valve constructed in accordance with the present invention, and with the clapper type valve member shown by solid lines in its closed position and by broken lines in its open position.

FIG. 3 is an exploded longitudinal sectional view of the valve, showing the valve member thereof in solid lines during its passage through the enlarged opening of the first tubular portion of the body into the mounted position shown in broken lines, and further showing the second tubular portion of the body and the seat on its inner end in position for disposal within the enlarged opening; and FIG. 4 is a cross-sectional view of the first tubular portion, as seen along broken line 4—4 of FIG. 3.

With reference now to the details of the above-described figures, the assembled valve 10 comprises a body 11 which includes a first tubular portion 12 and a second tubular portion 13. As previously described, the opening 16 through one end of the tubular portion 12 is enlarged to receive the second tubular portion 13 as well as the seat 22 on its inner end, and such second portion is connected to the first tubular portion by means of an annular weld 14 to form the flowway through the body. More particularly, the inner end of tubular portion 13 fits closely within the opening 16 and the outer end thereof has an annular shoulder 17 facing oppositely to the outer annular edge of the end of tubular portion 12 to form the groove in which weld 14 is disposed.

The other end of the first tubular portion 12 may be connected within a pipeline 18 or other conduit by means of an annular weld 19, and the outer end of the second tubular portion 13 may be connected within the same conduit by means of a similar weld 20. More particularly, the opening 21 through the tubular portion 13 as well as the seat 22 is approximately equal to the opening 23 through the other end of tubular portion 12. Thus, with the valve mmeber 24 swung to the open position shown by the dotted lines in FIG. 1, there is a substantially full opening through the valve body which, as also shown in FIG. 1, is aligned with the opening through the conduit 18.

Figure 2:
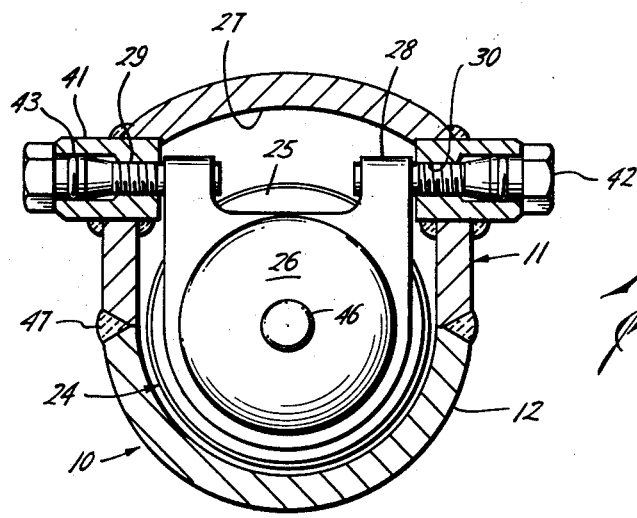
FIG. 2 is a cross-sectional view of the valve of FIG. 1, as seen along broken line 2—2 thereof.

The valve member 24 comprises a disc 25 supported by means of a carrier 26 for swinging about an axis disposed transversely of the flowway through the valve body between a closed position in which it engages the seat 22 and is disposed across the flowway, as shown in solid lines in FIG. 1, and an open position in which it is removed from the flowway and disposed within an offset 27 in the tubular portion 12, as shown by the broken lines in the same figure. As best shown in FIG. 2, the carrier has a pair of spaced-apart bearings 28 which receive hinge pins 29 extending through openings 30 in each side of the offset 27 of tubular portion 12.

Thus, the clapper 24 is free to swing about the pins 29 from its closed position to its open position in response to fluid flow from left to right, as shown in FIG. 1. On the other hand, in response to flow from right to left or in response to sufficiently small flow in either direction, the valve member is free to swing downwardly about the pins 29 to the closed position. In this latter position, a conically shaped surface 31 on the outer edge of the disc 25 seats firmly against a similarly shaped surface 32 on the inner end of the seat 22.

This seat comprises a ring 33 of metal or other substantially rigid material having a recess on the surface 32 to receive an annular sealing member 34 of any suitable sealing material, such as "Teflon" or the like. The ring also has a recess about its outer circumference to receive another annular sealing member 35 which may be an O-ring of rubber or other suitable material sealingly slidable within the opening 16 through tubular portion 12. The seat is urged to the right and thus for engaging the sealing surface 31 of disc 25 by means of a wave-type spring 36 disposed between the outer end of the ring 33 and the innermost annular edge of the second tubular portion 13. More particularly, this spring is confined within a recess formed between the opening 16 and a flange 37 extending from the outer end of the seat ring and closely received by a reduced portion 38 on the inner end of the tubular portion 13.

The inward urging of the seat 22 is limited by the engagement of an annular shoulder 39 thereon with a corresponding shoulder 40 on the opening 16 of tubular portion 12. This limit is so located as to dispose the seating surface 32 of the seat right slightly beyond (or to the right of) the position it occupies when engaged by the closed valve member. Thus, the spring yields to first cushion the closing movement of the clapper and then maintain the seat in tight sealing engagement therewith.

As best shown in FIG. 2, the opening 30 for threadedly receiving each pin 29 is formed within a socket 41 welded within the tubular portion 12 of the body at each side of offset 27. Each pin 29 has a head 42 on its outer end which may be manipulated by any suitable tool for insertion into and removal from the carrier-holding position of FIG. 2, and as can be seen from this latter figure, these pins are located in holding position by the abutment of these heads with the outer ends of sockets 41. When the pins are disposed in such position, O-rings 43 or the like disposed about them sealingly engage within openings 30 through the sockets to prevent the loss of pressure from within the valve.

The disc 25 of the clapper 24 is supported from the carrier 26 by means of a bolt 44 having its inner end threadedly connected within a central opening in the disc 25. A ring 45 of rubber or other resilient material surrounding the bolt intermediate the head of the bolt and the back of the disc has a groove about it which receives a central opening in the carrier 26. A rubber cover 46 on the outer end of the nut 44 serves as a shock absorber when the clapper is swung upwardly into the open position of FIG. 1.

Due to the above-described manner in which it is supported from the carrier, the disc 25 is free to rotate about an axis extending longitudinally of the flowway, which rotation will normally occur in random fashion as the valve opens and closes. This, of course, distributes the wear about the seating surface 31 of the disc, which would otherwise be concentrated at its lower end where there is initially a great rush of fluid upon initial opening or final closing movement of the valve. Also, the resilinet ring 45 enables a certain amount of flexing of the disc relative to the carrier so as to permit the disc to seat firmly and evenly about the seating surface 32 on the end of the seat 22.

The carrier 26 comprises a thin and relatively light plate, and the bearings 28 are formed by ears on the plate which are turned downwardly and under to define openings of a size to closely receive the inner ends of the pins 29. As can be seen in FIGS. 1 and 3, both the disc and carrier are preferably slightly concave with respect to the right end of the valve body so as to provide greater strength against the flow from right to left which the disc normally contains when closed.

As best shown in FIGS. 3 and 4, the tubular portion 12 of the body is made up of substantially semi-cylindrically shaped pressed out plates 12a and 12b which are connected together along their longitudinal edges. Preferably, the edges of plates 12a and 12b abut with one another along the inner circumference of the right end of tubular portion 12 so that only a single outside weld 47 is required. However, at the left end of tubular portion 12, the longitudinal edges of the plates 12a and 12b are so formed as to provide abutting surfaces intermediate the inner and outer circumference of such tubular portion, whereby as best shown in FIG. 4, the plates may be welded together along inner and outer welds 48 and 49. Upon completion of the inner weld 48, its inner surface is ground to provide a smooth continuous surface with the opening 16 for sealably engaging the O-ring 35 of the seat 22.

In the assembly of the valve, and upon formation of the tubular portion 12, the clapper 24 is laid horizontally to dispose its minimum lateral dimension transversely of the opening 16, that is, with the bearings in a trailing or leading position and then passed through such opening into a position opposite the offset 27. Then, the clapper is turned approximately 90° so as to dispose its bearings 28 opposite the openings 30 in sockets 41 of tubular portion 12. With the clapper so held, the pins 29 are moved inwardly to extend into the bearings 28 and thereby support the clapper for swinging between opened and closed positions.

At this time, the seat 22 is moved through the opening 16 on the left end of the tubular portion 12 and into approximately the position thereof shown in FIG. 1. The seat is followed by the spring 36 and the inner end of tubular portion 13 which, similarly to the seat 22, fits closely within the opening 16 of the left end of tubular portion 12. More particularly, the innermost annular edge of the inner end of tubular portion 12 will compress the spring 36 to yieldably urge the seat inwardly into engagement with the closed valve member. With the body portion 13 so disposed, it is welded to tubular portion 12 by means of the single annular weld 14 or other suitable means.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A check valve, comprising a body having a flowway therethrough, an annular seat comprising a ring within the flowway, means forming a sliding seal between the seat and flowway, a clapper type valve member, means mounting the valve member for swinging within the valve body between a first position providing an opening through the flowway and a second position sealably engaged against an end of the seat ring to close the flowway, and means between the valve body and seat ring yieldably urging said end of said ring toward sealing engagement with the valve member so as to cushion the swinging of same from said first position to said second position.

2. A check valve, comprising a body including a first tubular portion and a second tubular portion fitting within the opening through one end of the first portion and connected to said first portion to provide a flowway through the body, an annular seat on the inner end of the second tubular portion, comprising a ring separate from the second tubular portion and sealably slidable within the first tubular portion, the bores through the other end of the first portion of the body, the second portion of the body, and the seat being axially aligned and approximately equal in diameter to provide a full opening through the valve body, a clapper type valve member, means mounting the valve member on the first tubular portion for swinging about an axis spaced outwardly from the bore through the seat between a position adjacent the inner wall of the first tubular portion and outside of the full opening and a position on the seat and across the flowway to close same, said opening through the one end of the first tubular portion being large enough to pass said valve member into position for mounting within the first tubular portion prior to assembly of the seat and second tubular portion within said first tubular portion, and means between the seat ring and second tubular portion yieldably urging the seating surface of said ring toward seating engagement with the valve member.

References Cited by the Examiner

UNITED STATES PATENTS

| | | | |
|---|---|---|---|
| 1,948,628 | 2/34 | Penick | 251—332 |
| 2,268,518 | 12/41 | Sonderman | 137—515.5 |
| 2,504,006 | 4/50 | Davis | 137—527 XR |
| 2,532,067 | 11/50 | La Bour | 137—527.8 XR |
| 2,578,590 | 12/51 | Perrault | 137—527.8 XR |
| 2,588,775 | 3/52 | Smolensky | 137—515.5 |
| 2,869,221 | 1/59 | Siepmann | 251—367 XR |
| 2,882,923 | 4/59 | Smolensky | 137—515.5 |
| 2,925,241 | 2/60 | Baldwin | 251—174 XR |
| 2,925,827 | 2/60 | Anderson | 137—527.4 |
| 3,016,914 | 1/62 | Keithahn | 137—515 |

ISADOR WEIL, *Primary Examiner.*